United States Patent
Goloubew et al.

(10) Patent No.: US 10,977,574 B2
(45) Date of Patent: Apr. 13, 2021

(54) PREDICTION OF NETWORK DEVICE CONTROL PLANE INSTABILITIES

(71) Applicant: Cisco Technology, Inc., San Jose, CA (US)

(72) Inventors: Dmitry Goloubew, Waterloo (BE); Gonzalo Salgueiro, Raleigh, NC (US); Enzo Fenoglio, Issy-les-Moulineaux (FR); Hugo Latapie, Long Beach, CA (US); Andre Surcouf, Saint Leu la Foret (FR)

(73) Assignee: Cisco Technology, Inc., San Jose, CA (US)

( * ) Notice: Subject to any disclaimer, the term of this patent is extended or adjusted under 35 U.S.C. 154(b) by 471 days.

(21) Appl. No.: 15/432,385

(22) Filed: Feb. 14, 2017

(65) Prior Publication Data

US 2018/0234348 A1   Aug. 16, 2018

(51) Int. Cl.
*H04L 12/825* (2013.01)
*H04L 12/24* (2006.01)
(Continued)

(52) U.S. Cl.
CPC ........... *G06N 20/00* (2019.01); *G06N 3/0445* (2013.01); *G06N 3/0454* (2013.01); *G06N 3/08* (2013.01);
(Continued)

(58) Field of Classification Search
CPC ... H04L 47/25; H04L 41/0816; H04L 41/142; H04L 41/16; H04L 41/147;
(Continued)

(56) References Cited

U.S. PATENT DOCUMENTS 7,508,772 B1 *  3/2009  Ward ...................... H04L 45/02
                                                    370/254
7,668,953 B1 *  2/2010  Sinclair ................... H04L 41/16
                                                    709/224
(Continued)

FOREIGN PATENT DOCUMENTS

CN         106371422 A  *  2/2017
EP          2904551 A2  *  8/2015  ............. G06N 5/048
(Continued)

OTHER PUBLICATIONS

Boushaba, et al., "SGRL—Selective Gateway and Reinforcement Learning based routing for WMN", 2015 IEEE/ACS 12th International Conference of Computer Systems and Applications (AICCSA), 2015, 8 pages, IEEE.
(Continued)

*Primary Examiner* — Kostas J Katsikis
(74) *Attorney, Agent, or Firm* — Behmke Innovation Group LLC; Kenneth J. Heywood; James J. Wong

(57) ABSTRACT

In one embodiment, a device in a network receives control plane packet data indicative of control plane packets for a control plane in the network. The device models the control plane using a machine learning model based on the control plane packet data. The device predicts an instability in the control plane using the machine learning model. The device causes performance of a mitigation action based on the predicted instability in the control plane.

18 Claims, 7 Drawing Sheets

(51) Int. Cl.

| | |
|---|---|
| G06N 99/00 | (2019.01) |
| G06N 20/00 | (2019.01) |
| H04L 12/26 | (2006.01) |
| G06N 3/04 | (2006.01) |
| G06N 7/00 | (2006.01) |
| G06N 3/08 | (2006.01) |
| H04L 12/707 | (2013.01) |
| H04L 12/803 | (2013.01) |

(52) U.S. Cl.
CPC .......... G06N 7/005 (2013.01); H04L 41/142 (2013.01); H04L 41/147 (2013.01); H04L 41/16 (2013.01); H04L 43/04 (2013.01); *H04L 41/0631* (2013.01); *H04L 45/22* (2013.01); *H04L 47/122* (2013.01)

(58) Field of Classification Search
CPC ..... H04L 41/0631; H04L 43/04; G06N 20/00; G06N 99/005; G06N 3/02
See application file for complete search history.

(56) References Cited

U.S. PATENT DOCUMENTS

| | | | | |
|---|---|---|---|---|
| 7,684,321 | B2* | 3/2010 | Muirhead | H04L 41/145 |
| | | | | 370/230 |
| 7,764,700 | B2* | 7/2010 | Muirhead | H04L 63/1408 |
| | | | | 370/401 |
| 9,338,065 | B2 | 5/2016 | Vasseur et al. | |
| 9,426,036 | B1* | 8/2016 | Roy | G06N 20/00 |
| 9,547,828 | B2* | 1/2017 | Mermoud | H04L 47/00 |
| 9,900,790 | B1* | 2/2018 | Sheen | G06N 20/00 |
| 9,998,480 | B1* | 6/2018 | Gates | H04L 63/1408 |
| 10,069,759 | B1* | 9/2018 | Vadera | H04L 47/823 |
| 10,333,789 | B1* | 6/2019 | Dippenaar | H04L 63/00 |
| 10,449,956 | B2* | 10/2019 | Wyffels | G01S 17/42 |
| 10,469,329 | B1* | 11/2019 | Eicher | H04L 41/0896 |
| 10,474,955 | B1* | 11/2019 | Santhanam | H04L 43/08 |
| 10,489,711 | B1* | 11/2019 | Inbar | H04L 41/142 |
| 10,554,738 | B1* | 2/2020 | Ren | H04L 67/1025 |
| 2003/0123446 | A1* | 7/2003 | Muirhead | H04L 41/5009 |
| | | | | 370/392 |
| 2007/0174449 | A1* | 7/2007 | Gupta | H04L 41/147 |
| | | | | 709/224 |
| 2007/0286198 | A1* | 12/2007 | Muirhead | H04L 63/1408 |
| | | | | 370/392 |
| 2008/0002576 | A1* | 1/2008 | Bugenhagen | H04L 41/5003 |
| | | | | 370/229 |
| 2008/0049775 | A1* | 2/2008 | Morrill | H04L 41/5003 |
| | | | | 370/419 |
| 2008/0052393 | A1* | 2/2008 | McNaughton | H04L 41/147 |
| | | | | 709/224 |
| 2009/0262650 | A1* | 10/2009 | Shaikh | H04L 41/0631 |
| | | | | 370/242 |
| 2011/0231704 | A1* | 9/2011 | Ge | G06F 11/0709 |
| | | | | 714/26 |
| 2011/0238843 | A1* | 9/2011 | Pan | H04L 45/22 |
| | | | | 709/227 |
| 2012/0072574 | A1* | 3/2012 | Wang | H04L 41/142 |
| | | | | 709/224 |
| 2013/0173514 | A1* | 7/2013 | Cruickshank, III | H04L 41/147 |
| | | | | 706/20 |
| 2013/0275567 | A1* | 10/2013 | Karthikeyan | H04L 41/0893 |
| | | | | 709/221 |
| 2013/0290512 | A1* | 10/2013 | Ngoo | H04L 41/0853 |
| | | | | 709/224 |
| 2013/0311626 | A1* | 11/2013 | Karthikeyan | H04L 41/147 |
| | | | | 709/221 |
| 2013/0311673 | A1* | 11/2013 | Karthikeyan | H04L 45/42 |
| | | | | 709/239 |
| 2013/0322285 | A1* | 12/2013 | Fidler | H04L 43/50 |
| | | | | 370/252 |
| 2013/0332602 | A1* | 12/2013 | Nakil | H04L 45/38 |
| | | | | 709/224 |
| 2014/0029432 | A1* | 1/2014 | Vasseur | H04L 41/5025 |
| | | | | 370/236 |
| 2014/0058985 | A1* | 2/2014 | Osin | G06N 3/08 |
| | | | | 706/12 |
| 2015/0222557 | A1* | 8/2015 | Bhattacharya | H04L 47/32 |
| | | | | 370/237 |
| 2015/0249512 | A1* | 9/2015 | Adimatyam | G06F 11/1458 |
| | | | | 725/107 |
| 2015/0295816 | A1* | 10/2015 | Roper | H04L 41/14 |
| | | | | 709/224 |
| 2015/0317197 | A1* | 11/2015 | Blair | G06N 7/005 |
| | | | | 714/47.3 |
| 2015/0332165 | A1* | 11/2015 | Mermoud | H04L 45/02 |
| | | | | 706/12 |
| 2015/0333992 | A1* | 11/2015 | Vasseur | H04L 12/4641 |
| | | | | 370/252 |
| 2015/0333997 | A1* | 11/2015 | Mermoud | H04L 45/00 |
| | | | | 370/252 |
| 2015/0379423 | A1 | 12/2015 | Dirac et al. | |
| 2016/0026542 | A1* | 1/2016 | Vasseur | G06F 11/1464 |
| | | | | 714/4.11 |
| 2016/0055760 | A1* | 2/2016 | Mirabile | G16H 10/20 |
| | | | | 434/236 |
| 2016/0057061 | A1* | 2/2016 | Avci | H04L 47/125 |
| | | | | 370/235 |
| 2016/0088006 | A1* | 3/2016 | Gupta | H04L 41/16 |
| | | | | 726/23 |
| 2016/0239756 | A1* | 8/2016 | Aggour | H04L 41/142 |
| 2016/0241463 | A1* | 8/2016 | D'Souza | H04L 45/22 |
| 2016/0315808 | A1* | 10/2016 | Saavedra | H04L 47/24 |
| 2016/0359719 | A1* | 12/2016 | Travostino | H04L 41/16 |
| 2017/0019312 | A1* | 1/2017 | Meyer | G06N 20/00 |
| 2017/0019328 | A1* | 1/2017 | Moreno | H04L 45/22 |
| 2017/0061311 | A1* | 3/2017 | Liu | H04L 43/04 |
| 2017/0085617 | A1* | 3/2017 | Bovik | H04L 41/16 |
| 2017/0195132 | A1* | 7/2017 | Burgio | H04L 12/46 |
| 2017/0279685 | A1* | 9/2017 | Mota | H04L 43/08 |
| 2017/0279835 | A1* | 9/2017 | Di Pietro | H04L 63/145 |
| 2017/0279847 | A1* | 9/2017 | Dasgupta | H04L 12/66 |
| 2017/0316324 | A1* | 11/2017 | Barrett | G06Q 10/04 |
| 2017/0339022 | A1* | 11/2017 | Hegde | H04L 41/142 |
| 2018/0040064 | A1* | 2/2018 | Grigg | G06N 5/022 |
| 2018/0074570 | A1* | 3/2018 | Akella | G06N 20/00 |
| 2018/0114012 | A1* | 4/2018 | Sood | G06F 21/53 |
| 2018/0146007 | A1* | 5/2018 | Cruz Mota | H04L 63/1416 |
| 2018/0150758 | A1* | 5/2018 | Niininen | G06N 20/00 |
| 2018/0173501 | A1* | 6/2018 | Srinivasan | G06Q 10/063112 |
| 2018/0183660 | A1* | 6/2018 | Byers | H04L 41/147 |
| 2018/0203446 | A1* | 7/2018 | Wyffels | B60W 30/09 |
| 2018/0204129 | A1* | 7/2018 | Vasseur | H04L 12/1818 |
| 2019/0296968 | A1* | 9/2019 | Xue | H04L 41/0677 |

FOREIGN PATENT DOCUMENTS

| | | | |
|---|---|---|---|
| JP | 2009239645 A | * 10/2009 | |
| WO | WO-2016145379 A1 | 9/2016 | |
| WO | WO-2016191499 A1 | * 12/2016 | G06N 7/005 |

OTHER PUBLICATIONS

Karl, et al., "Deep Variational Bayes Filters: Unsupervised Learning of State Space Models from Raw Data", Cornell University Library, https://arxiv.org/pdf/1605.06432v2.pdf, May 20, 2016, 12 pages, arXiv:1605.06432v2, arXiv.

Schuchard, et al., "Losing Control of the Internet: Using the Data Plane to Attack the Control Plane", CCS'10, Oct. 4-8, 2010, 3 pages, ACM.

Wu, et al., "Abnormal BGP Routing Dynamics Detection by Active Learning Using Bagging on Neural Networks", Studies in Computational Intelligence, Computer and Information Science 2009, pp. 61-72, 2009, Springer Berlin Heidelberg.

* cited by examiner

PREDICTION OF NETWORK DEVICE CONTROL PLANE INSTABILITIES

TECHNICAL FIELD

The present disclosure relates generally to computer networks, and, more particularly, to the prediction of network device control plane instabilities.

BACKGROUND

Control plane traffic is exchanged by networking devices (e.g., routers, switches, etc.) in a computer network for a variety of reasons. In some cases, the devices may exchange control plane traffic to identify the other networking devices and discern the best network path to send traffic towards a particular destination. In further cases, control plane traffic can be used to signal path changes in the network, such as in the case of device or link failure. However, this signaling can also lead to instabilities in the control plane. For example, one form of control plane instability is 'flapping' whereby a router causes the network to use different paths to a given destination in quick succession (e.g., by routing the traffic along a path A, then changing the routing path from A to another path B, then changing the routing path back to path A). Any number of different conditions can cause control plane instability to occur, such as misconfigurations, environmental or operational changes, and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
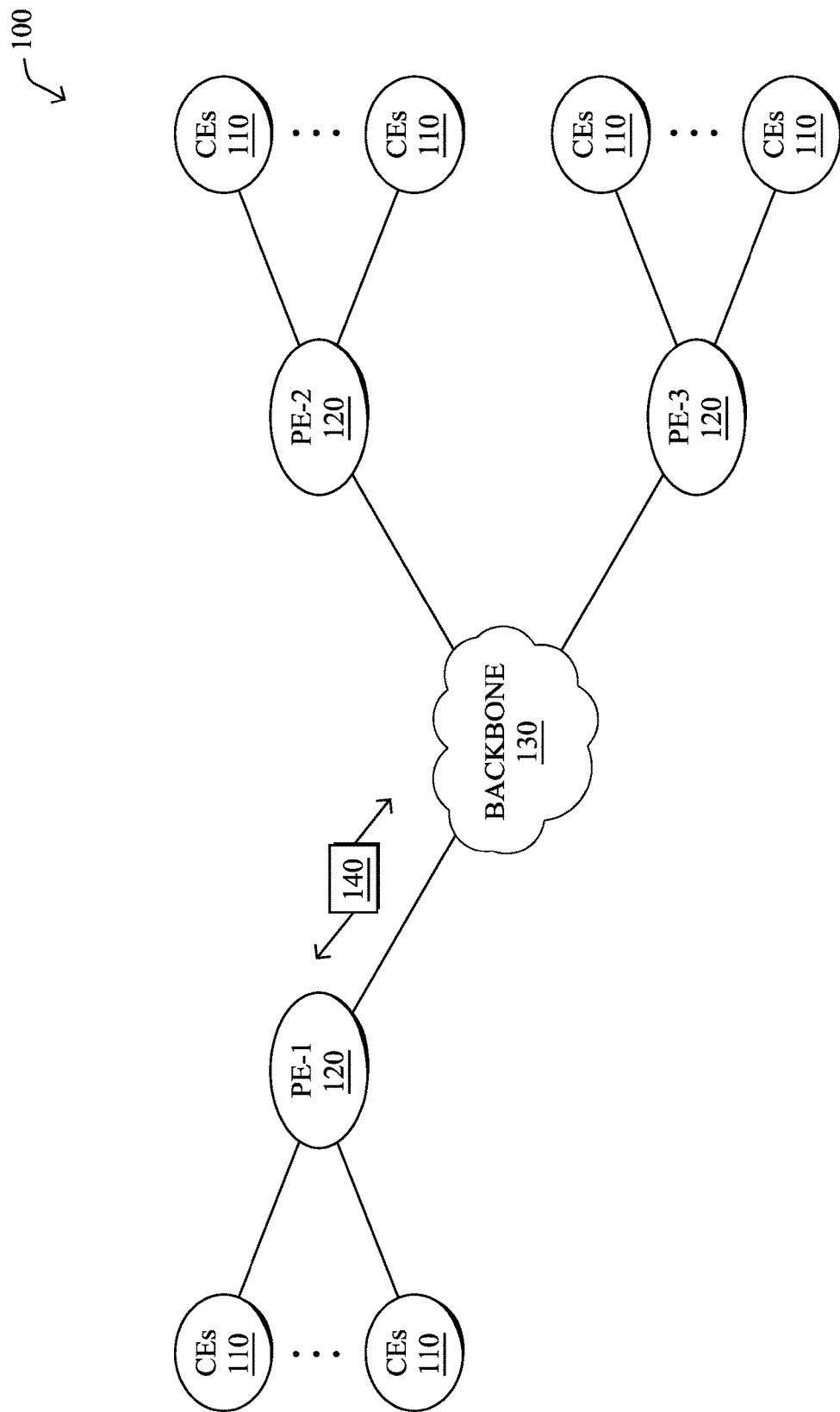
FIGS. 1A-1B illustrate an example communication network.

According to one or more embodiments of the disclosure, a device in a network receives control plane packet data indicative of control plane packets for a control plane in the network. The device models the control plane using a machine learning model based on the control plane packet data. The device predicts an instability in the control plane using the machine learning model. The device causes performance of a mitigation action based on the predicted instability in the control plane.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
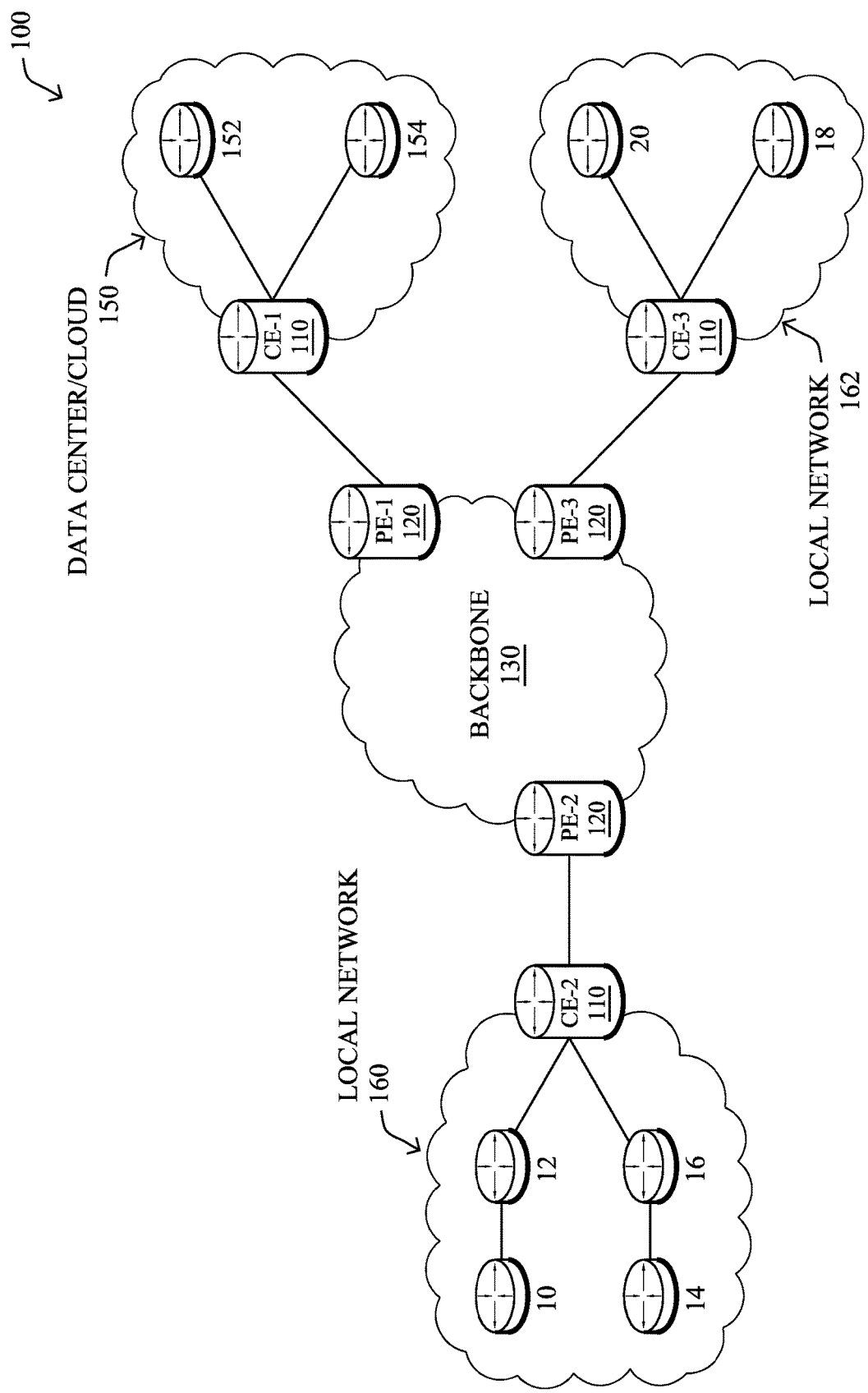

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, a webserver, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
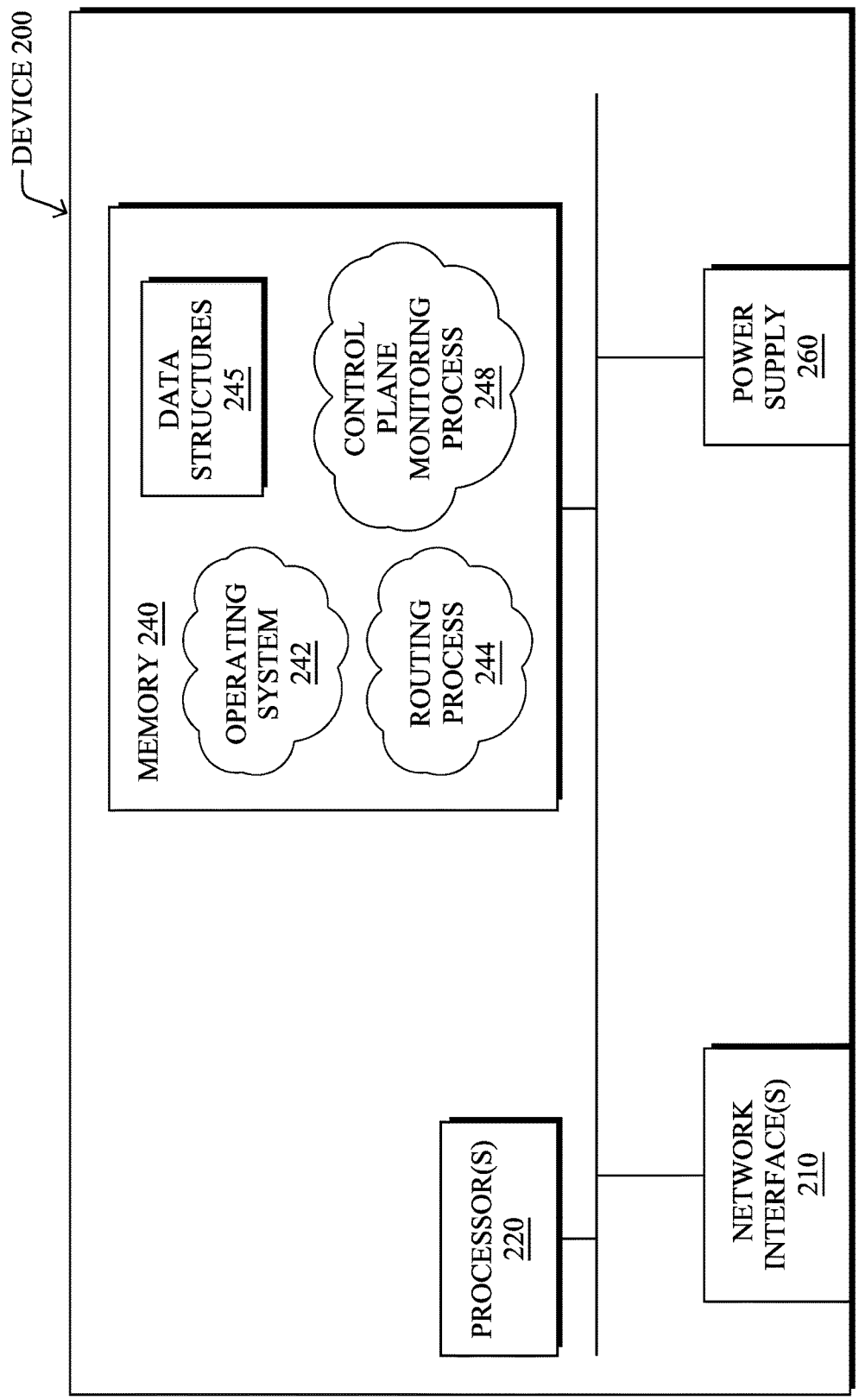
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process (service) 244 and/or a control plane monitoring process 248, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Further example routing protocols may include Enhanced Interior Gateway Routing Protocol (EIGRP), Tag Distribution Protocol (TDP), Hot Standby Router Protocol (HSRP), Multicast Source Discovery Protocol (MSDP), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Another example routing protocol that is typically used in LLN implementations is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Control plane monitoring process 248 includes computer executable instructions that, when executed by processor(s) 220, cause device 200 to predict and/or mitigate control plane instabilities (e.g., in the control plane of the network or device 200). For example, control plane monitoring process 248 may operate in conjunction with routing process 244, to assess control plane packets, events, etc. for signs of instability.

According to various embodiments, control plane monitoring process 248 may employ any number of different machine learning/deep learning techniques, to assess control plane information each concerned with the design and the development of techniques that receive empirical data as input (e.g., control plane packet data regarding control plane packets in the network) and recognize complex patterns in the input data. In various embodiments, control plane monitoring process 248 may employ one or more unsupervised or semi-supervised machine learning models. Generally, unsupervised techniques do not require a training set of labels, as in the case of a supervised model. Notably, an unsupervised model may lack any prior knowledge about the expected behavior of the control plane.

Figure 3:
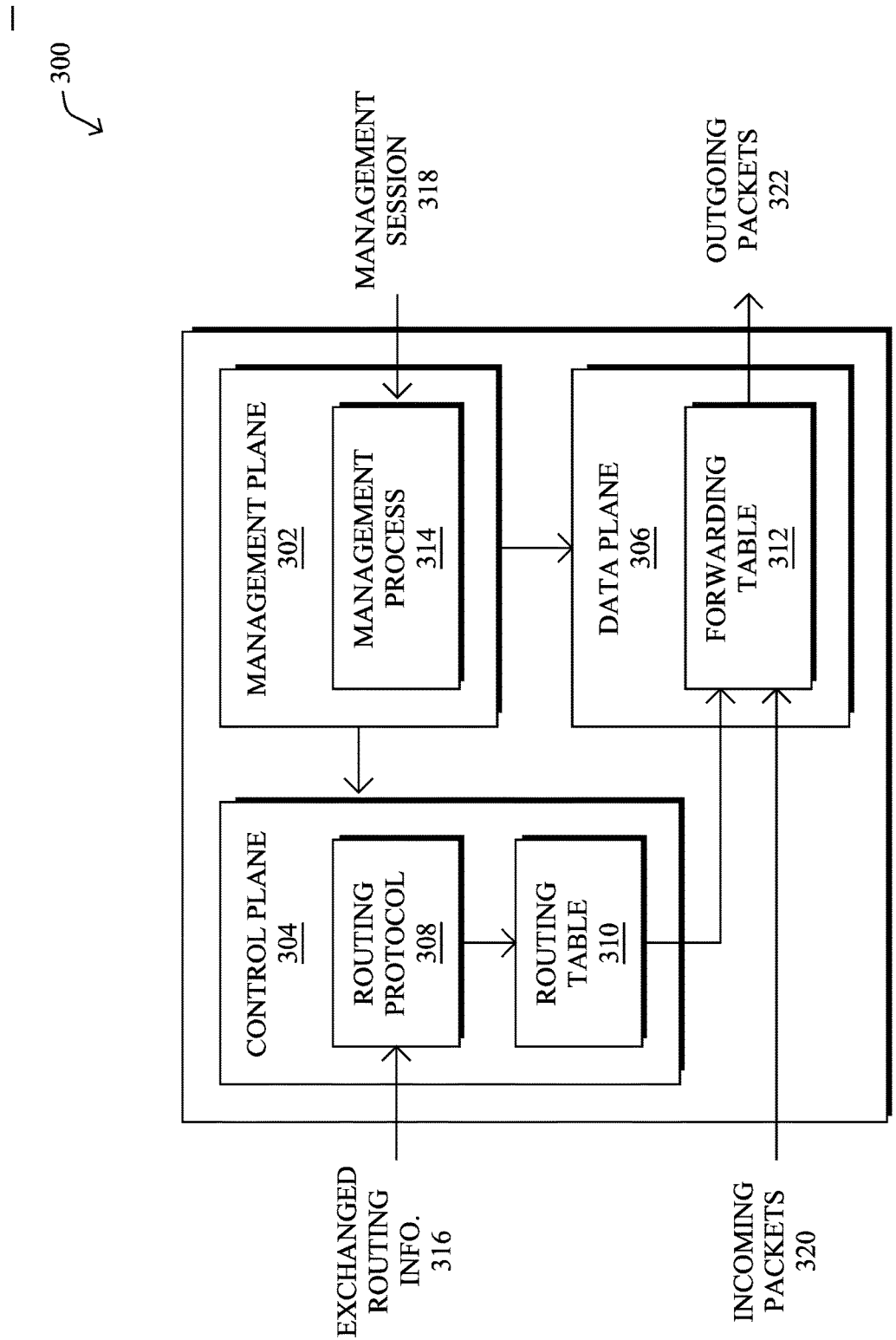
FIG. 3 illustrates an example of the operation of a network device/node.

FIG. 3 illustrates an example 300 of the operation of a network device/node (e.g., device 200), according to various embodiments. Typically, a network router will process traffic using multiple functional planes that compartmentalize the processing of the traffic associated with a given plane. As shown, for example, a router may divide its processing into a management plane 302, a control plane 304, and/or a data plane 306. Other functional planes may be used, in further implementations. While example 300 is presented primarily with respect to a network router, similar functional divisions can be found in other networking devices as well, such as switches, etc.

Generally, management plane 302 allows an administrator or another supervisory device to oversee and adjust the functioning of the networking device by interacting with a management process 314. For example, an administrator may initiate a management session 318 with the networking device, to adjust the operational parameters of the device. Example protocols that can be used for management session 318 may include, but are not limited to, Telnet, Secure Shell, File Transfer Protocol (FTP), Trivial FTP (TFTP), Network Time Protocol (NTP), Simple Network Management Protocol (SNMP), or the like.

Control plane 304 is responsible for the signaling that controls how data/user traffic in the network is communicated across the network. For example, in the case of a router, control plane 304 may exchange routing information 316 with other routers in the network, in accordance with a routing protocol 308. As noted above, examples of routing protocol 308 may include, but are not limited to, OSPF, ISIS, EIGRP, LDP, RPL, TDP, HSRP, BGP, MSDP, BGP, and the like. Typically, exchanged routing information 316 can serve multiple functions such as: 1.) discovering other routers in the network, 2.) configuring routing paths in the network as part of a routing topology between the routers, and 3.) signaling path/topology changes in the network (e.g., when a link between routers becomes unavailable, etc.). More specifically, one purpose of exchanged routing information 316 may be to populate a local routing table 310, which is used to determine where the device is to send data packets received by the device. For example, routing table 310 may include information such as a destination address, next hop address, interface, etc., that are used to control where a data packet is sent by the device.

Data plane 306 operates in conjunction with control plane 304 and is responsible for actually sending incoming data packets 320 in conjunction with the routing decisions made by control plane 304. Notably, data plane 306 may maintain a forwarding table 312 that is used to control how the device sends incoming data packets 320 as outgoing packets 322 to a particular next hop and using a particular interface. Forwarding table 312 may be populated using information from routing table 310 such as the interface identifier and next hop information for the reachable destination prefixes, etc. In other words, data plane 306 may process packets intended to go through the networking device and not to the networking device itself (e.g., in contrast to control plane packets that are destined to, or locally originated by, the networking device itself).

As noted above, there are a wide range of conditions that can cause instability on the control plane, which may or may not impact the forwarding plane. There are a very wide variety of factors and conditions that can cause, or manifest themselves as, control plane instabilities. For example, such instabilities may include, but are not limited to, routing protocol-based flapping, uncontrolled multicast packet replication, high resource consumption, etc.

Root cause analysis for control plane instabilities is often very complex and time consuming to troubleshoot. Notably, there may be hidden dependencies between protocols that are challenging to detect. Because of these dependencies, adjusting the control plane parameters is also an error-prone process, leading to potentially unstable configurations that could be put in production until the root cause is resolved. Further, these approaches are reactionary in nature, meaning that they only address instabilities that have already occurred.

Prediction of Network Device Control Plane Instabilities

The techniques herein allow for the proactive prediction of control plane instabilities in a network using machine learning. In some aspects, the techniques can be used to model the control plane by assessing the control plane packets, to predict control plane disturbances/instabilities (e.g., adjacency losses, timer expirations, etc.) based on the sequence of control plane packets. In further cases, the prediction can be used to initiate mitigation actions in the network, so as to avoid control plane instabilities before they actually occur.

Specifically, according to one or more embodiments of the disclosure as described in detail below, a device in a network receives control plane packet data indicative of control plane packets for a control plane in the network. The device models the control plane using a machine learning model based on the control plane packet data. The device predicts an instability in the control plane using the machine learning model. The device causes performance of a mitigation action based on the predicted instability in the control plane.

Illustratively, the techniques described herein may be performed by hardware, software, and/or firmware, such as in accordance with the control plane monitoring process 248, which may include computer executable instructions executed by the processor 220 (or independent processor of interfaces 210) to perform functions relating to the techniques described herein, e.g., in conjunction with routing process 244.

Figure 4:
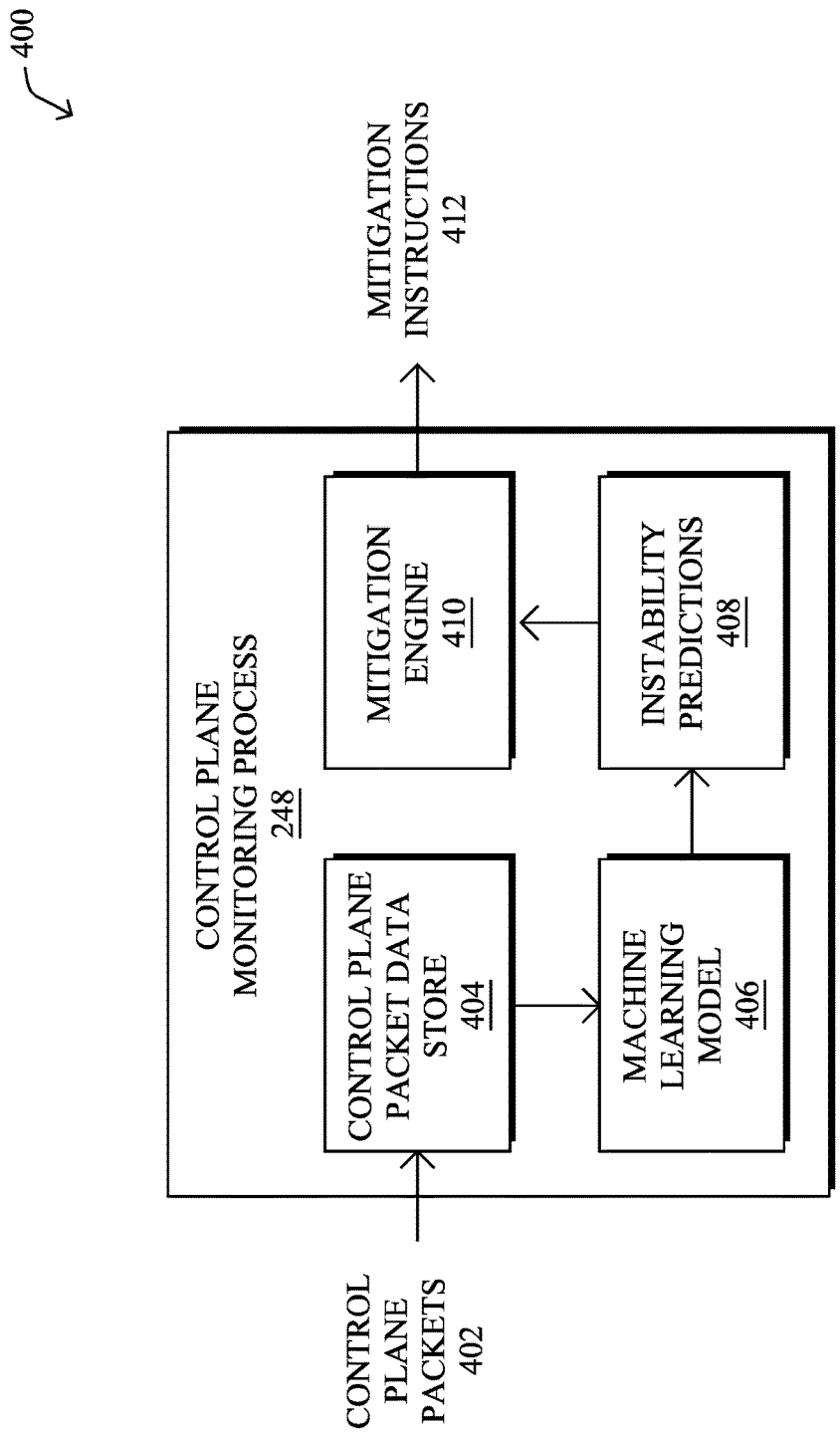
FIG. 4 illustrates an example architecture for predicting control plane instabilities.

Operationally, FIG. 4 illustrates an example architecture 400 for predicting control plane instabilities, according to various embodiments. As shown, control plane monitoring process 248 may include any number of sub-processes and/or may access any number of memory locations. As would be appreciated, these sub-processes and/or memory locations may be located on the same device or implemented in a distributed manner across multiple devices, the combination of which may be viewed as a single system/device that executes control plane monitoring process 248. Further, while certain functionalities are described with respect to the sub-processes and memory locations, these functions can be added, removed, or combined as desire, in further implementations.

As shown, control plane monitoring process 248 may receive control plane packets 402 and store data regarding the packets in a control plane packet data store 404 for analysis by a machine learning model 406. In general, control plane packet store 404 may include features extracted from control plane packets 402 regarding the state of the control plane. In further cases, packet data store 404 may store the control plane packets 402 themselves, which can be used as input to machine learning model 406 entirely or partially, in various embodiments. Using packet content requires a larger model 406, but is more likely to learn more nuanced behavior that is predictive of impending control plane instabilities and thus allowing prediction further into the future.

Generally, machine learning model 406 may be trained using a set of training data from data store 404, to predict control plane instabilities based on newly observed control plane packets 402 and/or features extracted from control plane packets 402. For example, the training dataset from data store 404 may be of the form: <packet><time><time_to_next_CP_instability>, to train machine learning model 406 to model the control plane. After training, machine learning model 406 may use any form of machine learning technique to assess newly observed control plane packet data in control plane packet data store 404 and predict instabilities in the control plane.

For example, data store 404 may include training or testing information indicative of the appearance of select syslog messages as a target event. For illustrative purposes only, such information may be of the following form:

% BGP-3-NOTIFICATION: sent to neighbor 1.1.1.1 (hold time expired)

% OSPF-5-ADJCHG: Process 1, Nbr 1.1.1.1 on Ethernet1/1 from FULL to DOWN, Neighbor Down: Dead timer expired % LDP-5-NBRCHG: LDP Neighbor 1.1.1.1 (1) is DOWN (Received error notification from peer: Holddown time expired)

% SPANTREE-7-MSGAGEEXPIRY: Msg Age timer expired on port 1/1 in VLAN 1

In another example, training data in data store 404 may include information indicative of the reappearance of a recently expired old flow for select protocol/port values, to use as an indication of instability. For example, machine learning model 406 may be trained to recognize conditions that may result in flapping in the network. Another source of training information could also come from runtime information, such as Netflow™ or IPFIX monitoring information provided by the network device itself (e.g., router, switch, etc.).

After training, machine learning model 406 may assess new control plane packet data from data store 404 and, based on the assessment, output instability predictions 408. In some cases, instability predictions 408 may be generalized in that they may only predict whether an instability is likely to occur, with a given probability. In other cases, instability predictions 408 may be more specific and also indicate the type of predicted instability (e.g., flapping, a specific event, etc.). For example, in one embodiment, machine learning model 406 may use a multiclass classifier at the top layer, to predict the type/origin of disturbance/instability, along with the predicted time to event.

In some embodiments, machine learning model 406 can also evaluate different configuration scenarios, to test the impact of a configuration change in the network. For example, using a testing set of data from data store 404, machine learning model 406 may predict whether the configuration change will cause an instability in the control plane. If so, the configuration change may be blocked or rolled back from deployment in the network.

Control plane monitoring process 248 may also include a mitigation engine 410. Generally, mitigation engine 410 is configured to generate mitigation instructions 412 based on instability predictions 408, in an attempt to mitigate or prevent the predicted instability from occurring or affecting data traffic in the network. For example, mitigation instructions 412 may cause a notification to be sent to a network administrator regarding the predicted instability, so that the administrator can take corrective measures. In other cases, mitigation instructions 412 may automatically effect configuration changes in the network such as rerouting sensitive traffic, adjusting routing paths, etc.

Figure 5:
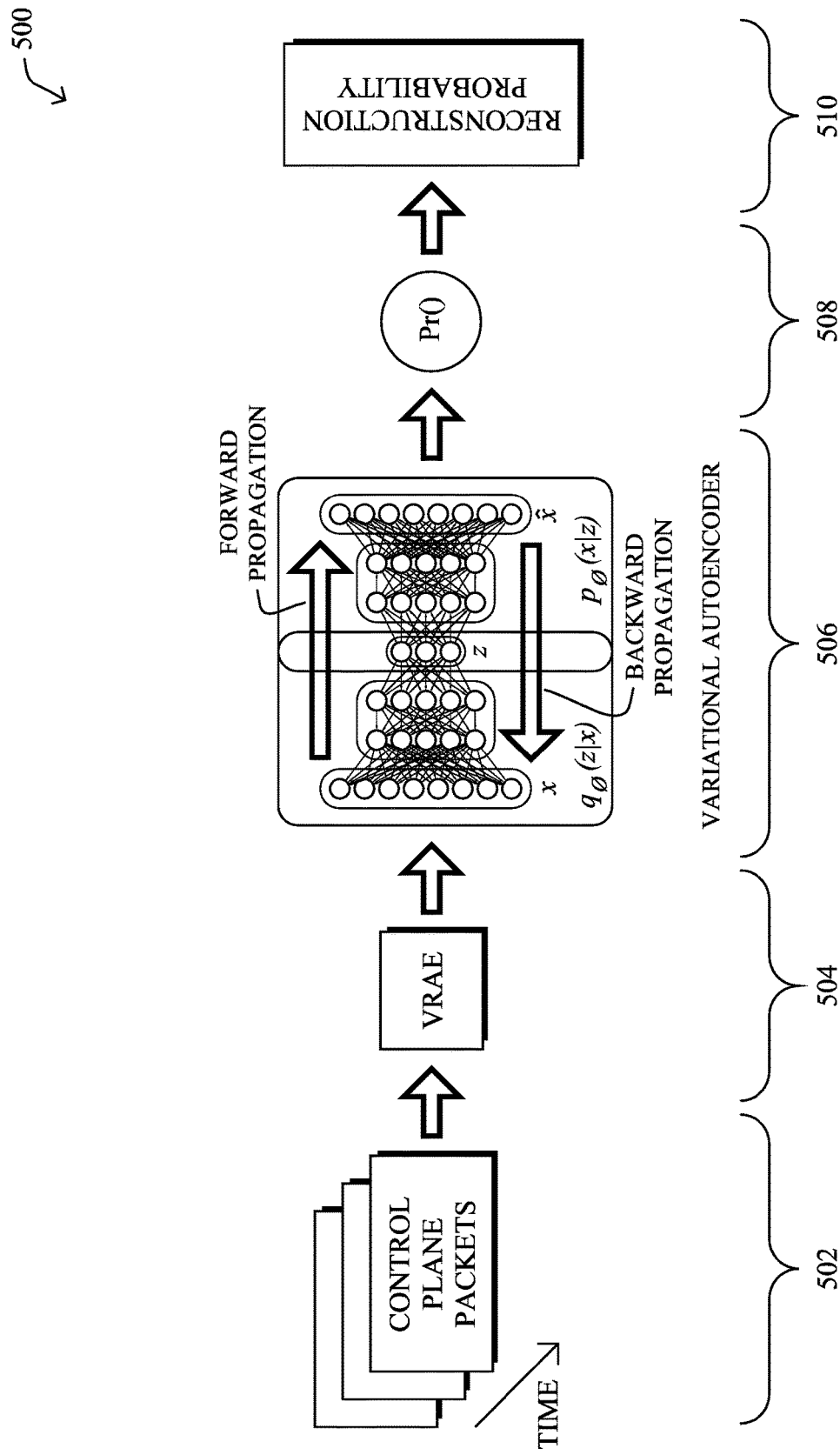
FIG. 5 illustrates an example implementation of a prediction model for control plane instabilities in a network.

FIG. 5 illustrates an example implementation of a prediction model 500 for control plane instabilities, according to various embodiments. As shown, the device monitoring the control plane may receive control plane packets 502 over the course of time for assessment, or features derived therefrom. At the core of prediction model 500 is a variational Bayesian learner 506 (e.g., a variational autoencoder), that predicts control plane instabilities of the next stream of control plane packets 502, given the sequence of previous control plane packets.

In various embodiments, model 500 may pre-process the time sequences of packets 502 for purposes of feature extraction using a recurrent temporal learner, such as variational recurrent autoencoder (VRAE) 504. In particular, VRAEs can efficiently map time sequences to a latent representation, thereby allowing for efficient, large scale unsupervised variational learning on time sequences. Training of VRAE 504 can also be achieved using stochastic gradient variational Bayes methods (SGVB). Other recurrent temporal learnings that could also be used may include Long Short Term Memory (LSTM)-based learners, recurrent neural networks (RNNs), and any other form of recurrent temporal learner that is mono-directional due to the type of the input sequences.

Processing of the extracted, latent representation from VRAE 504 can then be performed by variational Bayesian learner 506, which outputs a probability 508, Pr( ) of an instability in the control plane. In some embodiments, variational Bayesian learner 506 may be trained using unsupervised learning on a training dataset that is indicative of regular operational features and tested on a dataset which is also indicative of control plane disturbance/instability features (e.g., adjacency losses, timer expiration, etc.), to learn reconstructions that are close to the original input. The final output 510 can then be provided as a reconstruction probability between the input and the output of the autoencoder and used as an activation signal to detect the instability events. Generally, reconstruction probability errors are preferable for consumption over just reconstruction errors, although reconstruction errors can also be considered, in other embodiments. Notably, reconstruction probability errors are 1.) more objective than the reconstruction error given by classic autoencoders, 2.) do not require specific thresholds for deciding on anomalies, and 3.) have sound probabilistic foundation in the Bayesian statistics.

More specifically, the reconstruction probability of final output 510 may be calculated by the stochastic latent variables of the original input variable distribution that is already a probabilistic data reconstruction on the control plane packets 502, as provided by the recurrent autoencoder 504. What is being reconstructed by the variational Bayesian autoencoder(s) 506 are the parameters of the input variable latent distribution that is different from the raw input data but that keeps the same knowledge representation. Thus, model 500 provides for the advanced detection of control plane instabilities as a result of any configuration, operational, and/or environmental changes in the network.

Various implementations are also possible using model 500. For example, model 500 can be used to classify/predict the occurrence of an instability event within a defined time window. Another implementation may be operable to determine the time to the next instability event. In a further implementation, a multiclass classifier could be used at the top layer, to predict type/origin of disturbance along with time to event.

Figure 6:
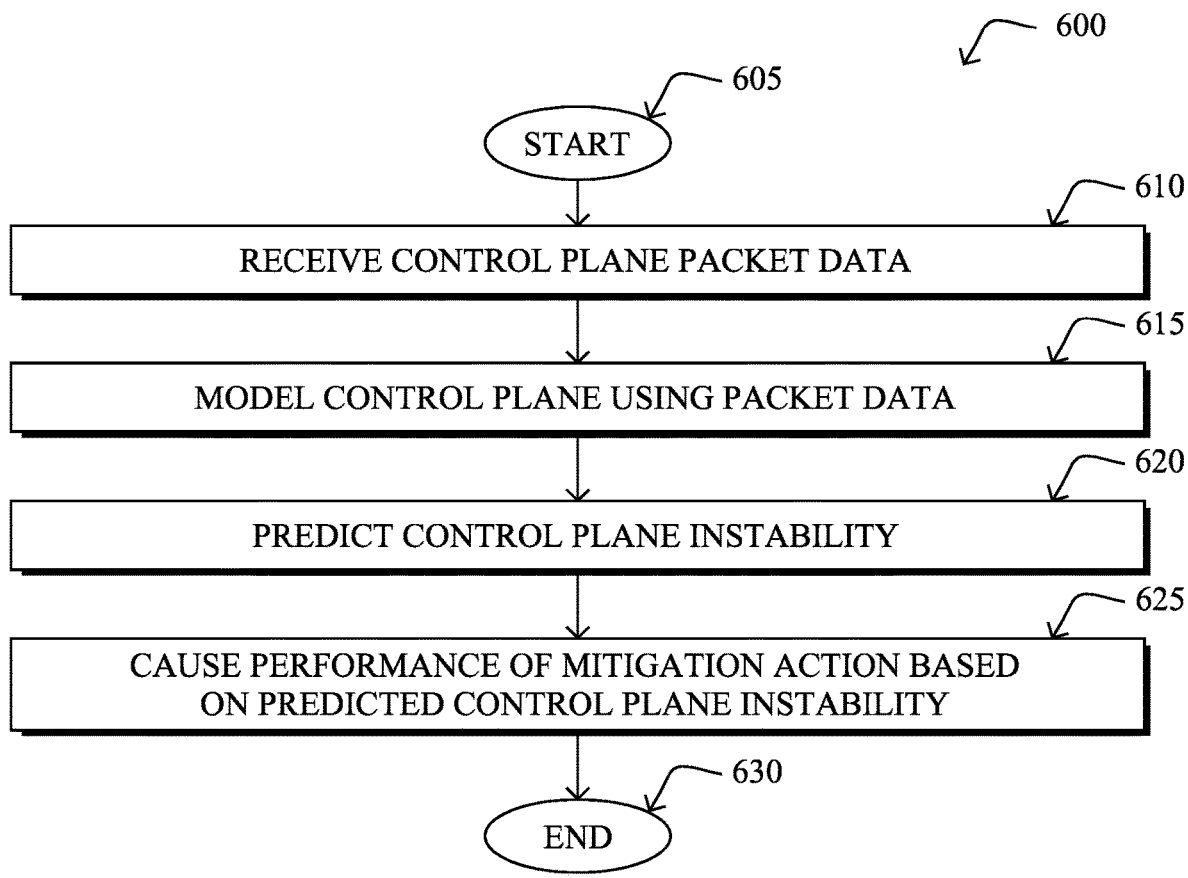
FIG. 6 illustrates an example simplified procedure for mitigating predicted control plane instabilities in a network.

FIG. 6 illustrates an example simplified procedure for mitigating predicted control plane instabilities in a network, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may receive control plane packet data indicative of control plane packets for a control plane in the network. In some cases, the control plane packet data may be copies of the control plane packets themselves. In other cases, the control plane packet data may be information obtained from the packets, such as system log data, extracted features, or the like. The device may also receive the control plane packet data directly (e.g., the device is itself a router, switch, or other networking device) or indirectly (e.g., from another device in the network associated with the control plane packets).

At step 615, as detailed above, the device may model the control plane using a machine learning model based on the control plane packet data. In general, the model may be operable to assess new control plane packet data, to predict whether a control plane instability is likely. Any form of machine learning model can be used to model the control plane. For example, in some cases, the model may use a variational Bayesian learning approach and may even pre-process the control packet data using a recurrent temporal learning model, such as a VRAE.

At step 620, the device may predict an instability in the control plane using the machine learning model, as described in greater detail above. For example, based on the most current set of control plane packet data, the model may predict whether a control plane instability is likely to occur. In some cases, the model may also determine or predict the time until the instability and/or the type of instability.

At step 625, as detailed above, the device may cause the performance of a mitigation action based on the predicted instability in the control plane. Any number of mitigation actions are possible, depending on the prediction. For example, the device may cause a notification to be sent to a network administrator regarding the predicted instability. In another example, such as when the time and/or type of instability is predicted, the device may cause a configuration change to be made in the network according to policy (e.g., by rerouting certain traffic along a different path, by changing a setting of the device or another device, etc.). Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, predict control plane instabilities before they occur. This allows the system to take mitigation actions, to avoid or reduce the impact of the instability, such as notifying a network operator or management system, enacting policy-based behaviors (e.g., rerouting sensitive traffic via a backup path, etc.), and the like. The techniques herein can also evaluate the overall stability of the network and detect latent configuration or scalability issues before they impact the operation of the network. Further, the techniques herein enable complex configuration sanity checks to be made, before the configuration is pushed into the network.

While there have been shown and described illustrative embodiments that provide for predicting control plane instabilities, it is to be understood that various other adaptations and modifications may be made within the spirit and scope of the embodiments herein. For example, while certain embodiments are described herein with respect to using certain machine learning models for purposes of predicting instabilities, the models are not limited as such and may be used for other functions, in other embodiments. In addition, while certain protocols are shown, such as BGP, other suitable protocols may be used, accordingly. Further, while the techniques herein are described with respect to specific networking devices (e.g., routers), the techniques herein can be applied to any form of networking device, such as switches, servers, virtual networking devices, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, control plane packet data indicative of control plane packets for a control plane in the network, wherein the control plane is responsible for signaling that controls how data traffic in the network is communicated across the network;
   extracting, by the device, one or more features from the control plane packet to be used as input to a machine learning model;
   modeling, by the device and based on a variational Bayesian approach, the control plane by using the one or more extracted features as input to the machine learning model, wherein the one or more extracted features are processed by a variational Bayesian learner which outputs a probability of an instability in the control plane;
   predicting, by the device, the instability in the control plane caused by a next stream of control plane packets predicted by the machine learning model, wherein the instability comprises at least one of routing protocol-based flapping, uncontrolled multicast packet replication, high resource consumption, adjacency losses, or timer expirations; and
   causing, by the device, performance of a mitigation action based on the predicted instability in the control plane.

2. The method as in claim 1, wherein the mitigation action comprises at least one of: generating a notification regarding the predicted instability or initiate a configuration change in the network.

3. The method as in claim 1, wherein the device comprises a network router or network switch.

4. The method as in claim 1, wherein the control plane packets comprise routing protocol packets.

5. The method as in claim 1, further comprising:
   executing, by the device, a machine learning-based classifier to determine a cause of the predicted instability.

6. The method as in claim 1, wherein modeling the control plane using the machine learning model based on the control plane packet data comprises:
   preprocessing, by the device, the control plane packet data using a recurrent temporal learning model, wherein the device processes a preprocessed control plane packet data using the variational Bayesian approach.

7. The method as in claim 6, wherein the recurrent temporal learning model comprises one of: a variational recurrent autoencoder (VRAE), a long short term memory (LSTM), or a recurrent neural network (RNN).

8. The method as in claim 1, wherein the control plane packet data indicates a reappearance of an expired packet flow in the control plane or indicates a control plane event.

9. A tangible, non-transitory, computer-readable medium storing program instructions that cause a device in a network to execute a process, comprising:

receiving, at the device, control plane packet data indicative of control plane packets for a control plane in the network, wherein the control plane is responsible for signaling that controls how data traffic in the network is communicated across the network;

extracting, by the device, one or more features from the control plane packet to be used to model the control plane as a machine learning model;

modeling, by the device and based on a variational Bayesian approach, the control plane by using the one or more extracted features as input to the machine learning model, wherein the one or more extracted features are processed by a variational Bayesian learner which outputs a probability of an instability in the control plane;

predicting, by the device, the instability in the control plane caused by a next stream of control plane packets predicted by the machine learning model, wherein the instability comprises at least one of routing protocol-based flapping, uncontrolled multicast packet replication, high resource consumption, adjacency losses, or timer expirations; and causing, by the device, performance of a mitigation action based on the predicted instability in the control plane.

10. The computer-readable medium as in claim 9, wherein the control plane packets comprise routing protocol packets.

11. An apparatus, comprising:

one or more network interfaces to communicate with a network;

a processor coupled to the network interfaces and configured to execute one or more processes; and a memory configured to store a process executable by the processor, the process when executed operable to:

receive control plane packet data indicative of control plane packets for a control plane in the network, wherein the control plane is responsible for signaling that controls how data traffic in the network is communicated across the network;

extract one or more features from the control plane packet to be used as input to a machine learning model;

model, based on a variational Bayesian approach, the control plane by using the one or more extracted features as input to the machine learning model, wherein the one or more extracted features are processed by a variational Bayesian learner which outputs a probability of an instability in the control plane;

predict the instability in the control plane caused by a next stream of control plane packets predicted by the machine learning model, wherein the instability comprises at least one of routing protocol-based flapping, uncontrolled multicast packet replication, high resource consumption, adjacency losses, or timer expirations; and cause performance of a mitigation action based on the predicted instability in the control plane.

12. The apparatus as in claim 11, wherein the apparatus comprises a network router or network switch.

13. The apparatus as in claim 11, wherein the control plane packets comprise routing protocol packets.

14. The apparatus as in claim 11, wherein the mitigation action comprises at least one of: generating a notification regarding the predicted instability or initiate a configuration change in the network.

15. The apparatus as in claim 11, wherein the apparatus models the control plane using the machine learning model based on the control plane packet data by:

preprocessing the control plane packet data using a recurrent temporal learning model, wherein the apparatus processes a preprocessed control plane packet data using the variational Bayesian approach.

16. The apparatus as in claim 15, wherein the recurrent temporal learning model comprises one of: a variational recurrent autoencoder (VRAE), a long short term memory (LSTM), or a recurrent neural network (RNN).

17. The apparatus as in claim 11, wherein the control plane packet data indicates a reappearance of an expired packet flow in the control plane or indicates a control plane event.

18. The apparatus as in claim 11, wherein the process when executed is further operable to:

execute a machine learning-based classifier to determine a cause of the predicted instability.

\* \* \* \* \*

UNITED STATES PATENT AND TRADEMARK OFFICE
CERTIFICATE OF CORRECTION

PATENT NO. : 10,977,574 B2  
APPLICATION NO. : 15/432385  
DATED : April 13, 2021  
INVENTOR(S) : Dmitry Goloubew et al.

Page 1 of 1

It is certified that error appears in the above-identified patent and that said Letters Patent is hereby corrected as shown below:

In the Specification

Column 10, Line 2, please amend as shown:
gradient variational Bayes methods (SGVB). Other recur- Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*